United States Patent [19]

Takeuchi

[11] Patent Number: 5,369,914
[45] Date of Patent: Dec. 6, 1994

[54] WEATHER STRIP

[75] Inventor: Norio Takeuchi, Hiroshima, Japan

[73] Assignee: Nishikawa Rubber Co., Ltd., Hiroshima, Japan

[21] Appl. No.: 11,661

[22] Filed: Jan. 29, 1993

[30] Foreign Application Priority Data

Jan. 31, 1992 [JP] Japan .................. 4-046317

[51] Int. Cl.$^5$ .................................................. E06B 7/16
[52] U.S. Cl. ........................... 49/495.1; 49/498.1; 49/475.1; 49/493.1
[58] Field of Search ............ 49/440, 441, 475.1, 49/489.1, 493.1, 495.1, 498.1

[56] References Cited

U.S. PATENT DOCUMENTS

| | | | |
|---|---|---|---|
| 2,607,966 | 8/1952 | Beck | 49/498.1 |
| 4,255,903 | 3/1981 | Reynolds et al. | 49/498.1 |
| 5,199,761 | 4/1993 | Dannecker et al. | 49/475.1 |

*Primary Examiner*—Michael J. Milano
*Attorney, Agent, or Firm*—Flynn, Thiel, Boutell & Tanis

[57] ABSTRACT

A weather strip having a fine outward appearance at the periphery of a gap seal and easily attachable to a door sash. The weather strip is attached to a door sash and elastically contacts an opening edge of a body for sealing a gap between the body and a door sash and elastically contacts a door glass for sealing a gap between a door glass and the door sash wherein the door sash comprises a substantially L-shaped outer portion and an inner protruding portion which protrudes toward the outer portion at the inside of the door. The weather strip further comprises a glass run attached to the door sash for elastically contacting the door glass and serving as a stopper of the door glass and a gap seal at the upper surface thereof, and a main seal attached to the door sash for elastically contacting the opening edge of the body wherein the glass run comprises a base portion which is retained to the outer portion 31 of the door sash by a stopper member such as a screw and has a U-shape in cross section and opens toward the outside of the car and has a core embedded therein, a lip seal and a hollow seal portion which are respectively connected to a lower tip end of the base portion wherein a hooking piece formed on the upper free end of the hollow seal is hooked by a hooking portion provided at the upper end of the bottom portion.

8 Claims, 3 Drawing Sheets

WEATHER STRIP

BACKGROUND OF THE INVENTION

1. Field of the invention

The present invention relates to a weather strip attached to a door sash and elastically contacting an opening edge of a body for sealing a gap between a door and the body and elastically contacting a door glass for sealing a periphery of the door glass.

2. Prior Art

A conventional weather strip will be described with reference to FIGS. 1 and 2.

Denoted at 14 is an inside of a car and 15 is an outside of the car. The following is used as the conventional weather strip which is attached to a door sash and elastically contacts an opening edge 11 of a body 10 for sealing the gap between the body 10 and a door sash and elastically contacts a door glass 21 for sealing the gap between the door glass 21 and the sash. That is, the door sash 70 comprises an outer portion 71 which opens toward the out, side of the car and has a U-shape in cross section and an inner protruding portion 72 which protrudes at the back of the outer portion 71 toward the inside of the car. Attached to the door sash 70 are a glass run 80 which elastically contacts the door glass 21, a U-shaped welt 90 which functions as a stopper of the door glass 21 and has a door cutline seal 91 at the upper surface thereof and a main seal 50 which elastically contacts the opening, edge 11 of the body 10 at the inside of the car. This is explained in more detail. The glass run composed of an upper hollow seal portion 83 and a lower lip seal 82 is attached to the inside of the U-shaped outer portion 71 by way of a retainer 75. The welt 90 having a core 92 is engaged with an upper flange 74 of the door sash 70 while the main seal 50 is attached to the upper surface of the inner protruding portion 72 by way of a retainer 73. Denoted at 51 is a trim for covering the outer flange 12 disposed outside the body 10 and elastically contacts the gap seal 91. denoted at 52 is a sub-seal which elastically contacts the surface of the inner protruding portion 72 at the inside of the car and is integrally connected to a U-shaped inner trim 53 which is engaged with an inner flange 13 provided at the inside of the body 10 and has a core 54.

From the designing point of view of the car, there is a demand to allow the periphery of the gap seal to be appeared lean from the upper end of the door glass 21 to the body 10. However, according to the conventional weather strip, an upper flange 74 of the door sash 70 is used as the stopper of the door glass 21 and the welt 90 having the gap seal 91 protruding therefrom is engaged with the upper flange 74 so that the length F extending from the upper end of the door glass 21 to the opening edge 11 of the body 10 is difficult to be reduced, which causes the problem of poor outward appearances.

SUMMARY OF THE INVENTION

It is an object of the present invention to provide a weather strip capable of remarkably in, proving the outward appearance.

The weather strip according to the present invention is attached to a door sash 30 and elastically contacts an opening edge 11 of a body 10 for sealing a gap between the body 10 and a door sash 30 and elastically contacts a door glass 21 for sealing a gap between a door glass 21 and the door sash 30 wherein the door sash 30 comprises a substantially L-shaped outer portion 31 and an inner protruding portion 32 which protrudes toward the outer portion 31 at the inside of the car.

A first aspect of the weather strip according to the present invention comprises a glass run 40 attached to the door sash 30 for elastically contacting the door glass 21 and serving as a stopper of the door glass 21 and a door cutline seal 46 at the upper surface thereof and a main seal 50 attached to the door sash 30 for elastically contacting the opening edge 11 of the body 11) wherein the glass run 40 comprises a base portion 41 which is retained to the outer portion 31 of the door sash 30 by a stopper member K such as a screw bot and has a U-shape in cross section and opens toward the outside of the car and has a core S embedded therein, a lip gap seal 42 and a hollow seal portion 43 which are respectively connected to a lower tip end of the bottom portion 41 wherein a hooking piece 44 formed on the upper free end of the hollow seal 43 is hooked by a hooking portion 45 provided at the upper end of the bottom portion 41.

A second aspect of the weather strip according to the present invention comprises a glass run 40 attached to the door sash 30 for elastically contacting the door glass 21 and serving as a stopper of the door glass 21 and a door cutline seal 46 at the upper surface thereof and a main seal 50 attached to the door sash 30 for elastically contacting the opening edge 11 of the body 10 wherein the glass run 40 comprises a base portion 41 which is retained to the outer portion 31 of the door sash 30 by a stopper member K such as a screw bot and has a U-shape in cross section and opens toward the outside of the car and has a core S embedded therein, a hollow seal portion 43 connected to the upper tip end of the base portion 41 and directed downward, an upward directed lip gap seal 42 and a downward hooking piece 44 respectively disposed in a T-shape and formed at the lower tip end of the hollow seal portion 43 wherein the hooking piece 44 is hooked by a hooking portion 45 provided at the lower tip end of the base portion 41 and extends to the inside of the car.

PREFERRED EMBODIMENT OF THE INVENTION

Figure 1:
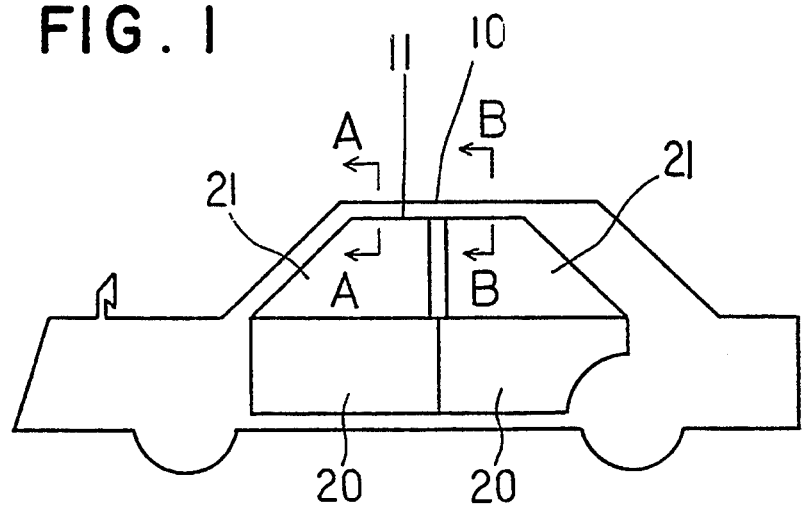
FIG. 1 is a side view of a car.
Figure 2:
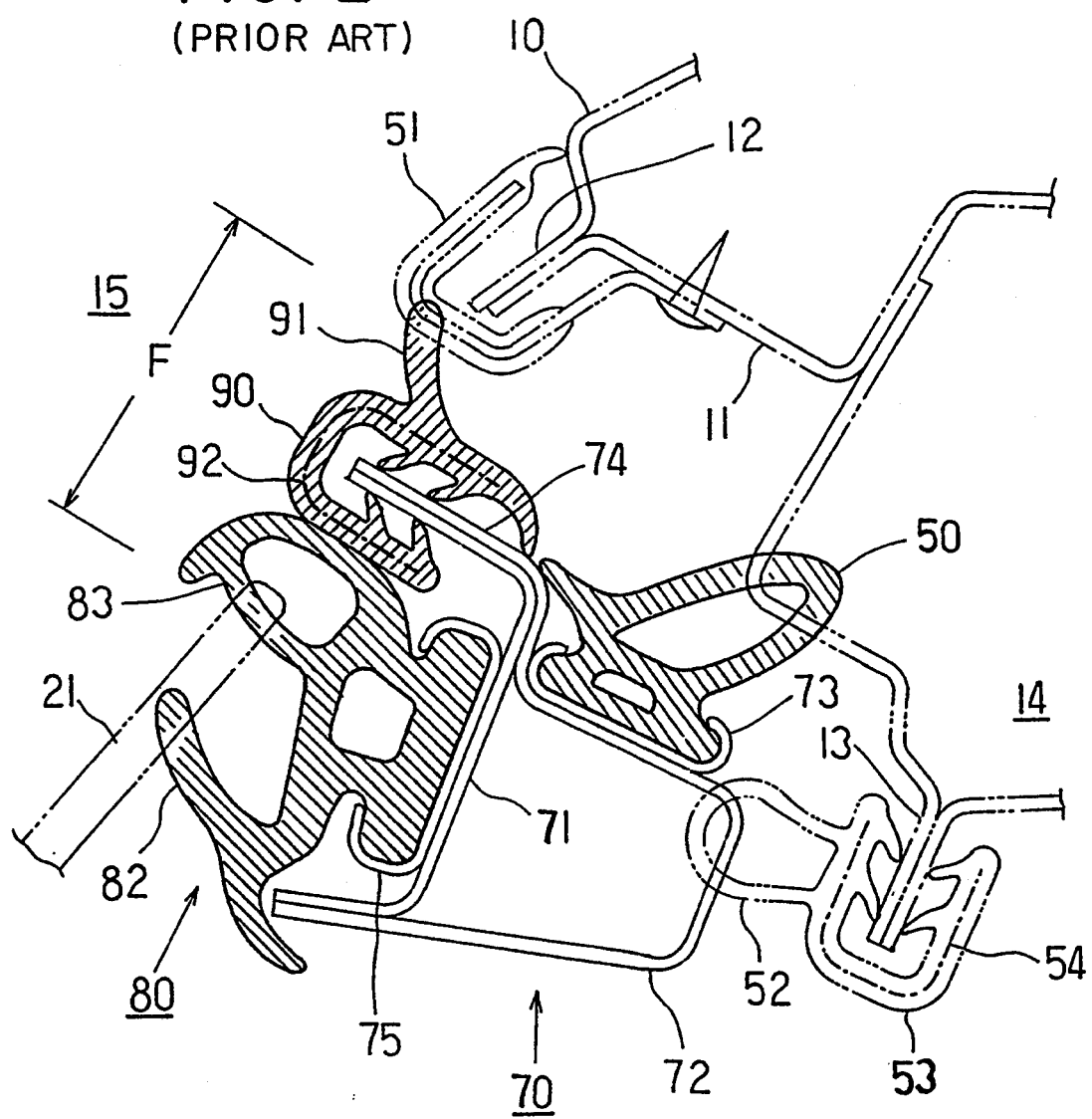
FIG. 2 is a cross-sectional view taken along A—A or B—B of a conventional weather strip in FIG. 1.

First Embodiment (FIG. 1, FIGS. 3 and 4):

A weather strip according to a first embodiment will be described with reference to FIG. 1 and FIGS. 3 and 4. Denoted at 10 is a body and 11 is an opening edge of the body 10. Denoted at 20 is a door and 21 is a door glass. Denoted at. 3() is a door sash which comprises a substantially L-shaped outer portion 31 and an inner protruding portion 32 which protrudes toward the inside of the car from the outer portion 31. The weather strip attached to the door sash 30 comprises a glass run 40 which elastically contacts the door glass 21 and functions as the stopper of the door glass 21 and has a gap seal 46 at the upper surface thereof and a main seal 50 which elastically contacts the body side opening edge 11 which is structured as follows. That is the glass run 40 has a base portion 41 which is open toward the outside of the car and has a U-shape in cross section and a cores embedded therein. The base portion 41 is fastened to the outer portion 31 of the door sash 30 by a fastening member K such as a screw bolt, a pop rivet, etc. Denoted at 50 is a main seal which is attached to the upper surface of the inner protruding portion 32 at the inside of the car by way of a retainer 35 and 51 is a trim which is engaged with the outer flange 12 provided outside the body 10 and elastically contacts the gap seal 46. Denoted at 52 is a sub-seal which elastically contacts the surface of the inner protruding portion 32 at the inside of the car and is integrally connected to a U-shaped inner trim 53 which is engaged with an inner flange 13 provided at the body 10 and at the inside of the car and has a core 54 embedded therein.

Figure 3:
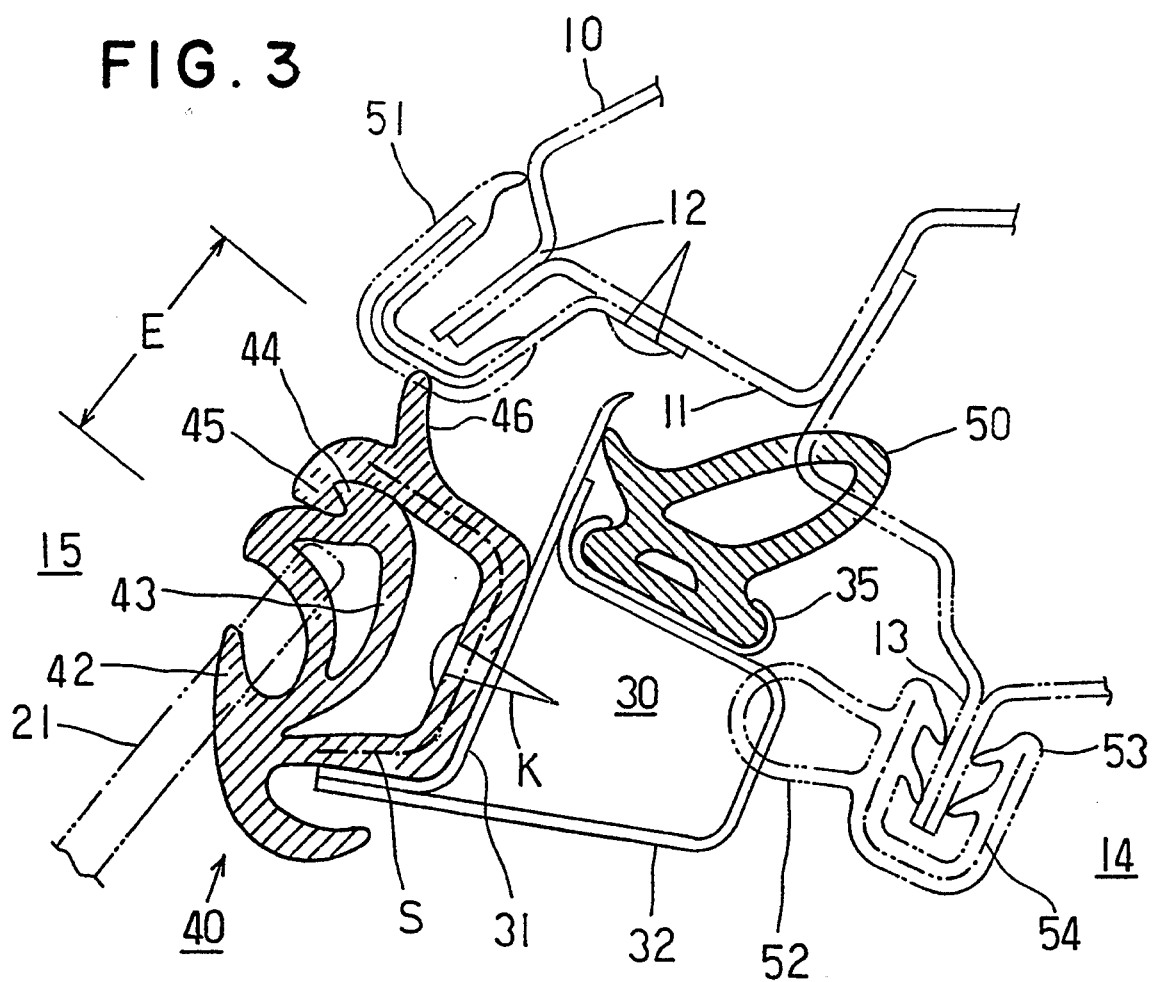
FIG. 3 is a cross-sectional view taken along A—A or B—B of a weather strip according to a first embodiment of the present invention in FIG. 1.
Figure 4:
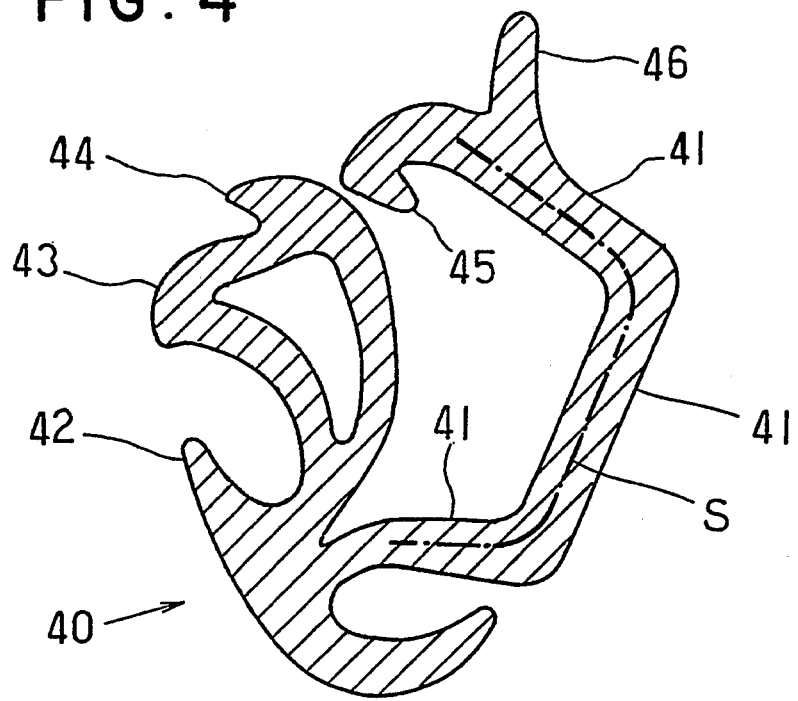
FIG. 4 is a cross-sectional view of a glass run of FIG. 3.

In the first embodiment as illustrated in FIGS. 3 and 4, denoted 42 and 43 are a lip seal and a hollow seal portion respectively connected to a lower tip end of the base portion 41 and 44 is a hooking piece formed at the upper free end of the hollow seal portion 43 and 45 is a hooking portion provided at the upper tip end of the base portion 41 which hooks the hooking piece 44.

Second Embodiment (FIG. 1 and FIGS. 5 and 6):

A weather strip according to a second embodiment will be described with reference to FIG. 1 and FIGS. 5 and 6.

Figure 5:
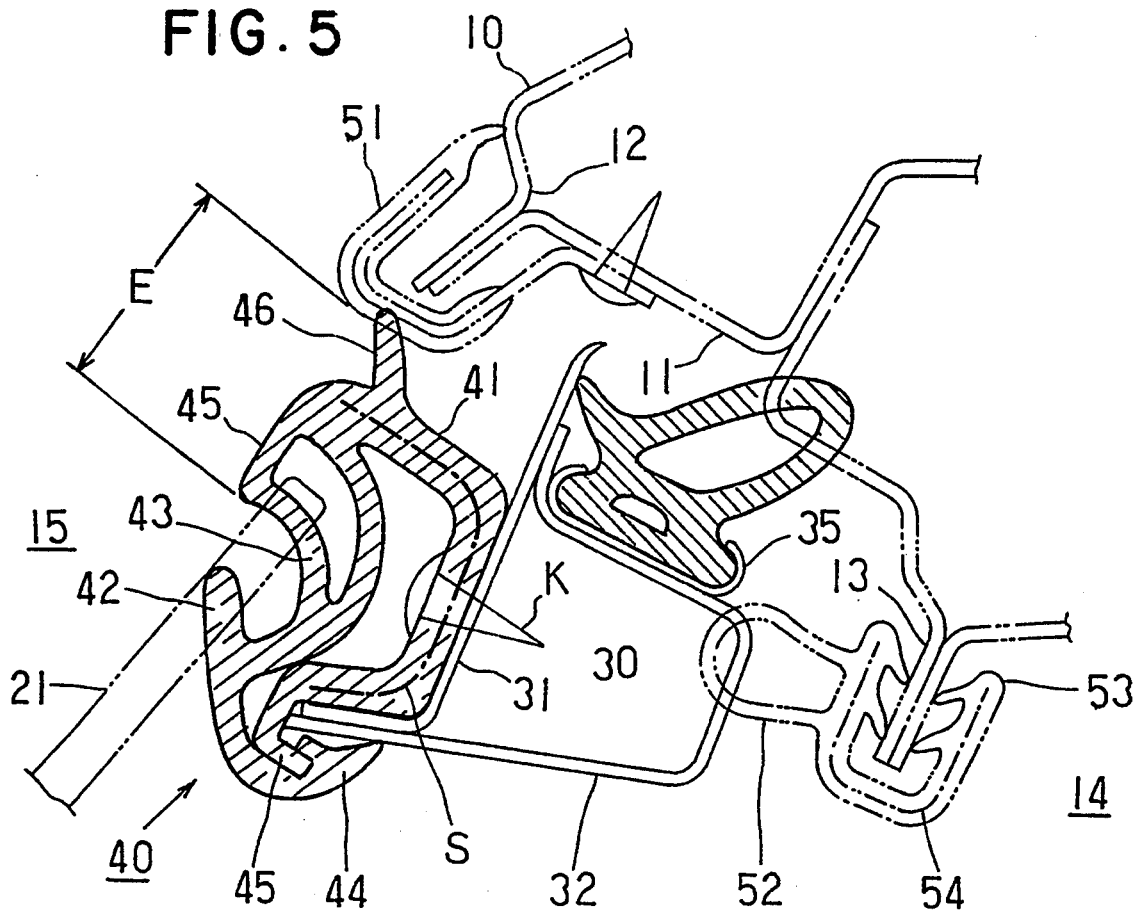
FIG. 5 is a cross-sectional view taken along A—A or B—B of a weather strip according to a second embodiment of the present invention in FIG. 1.
Figure 6:
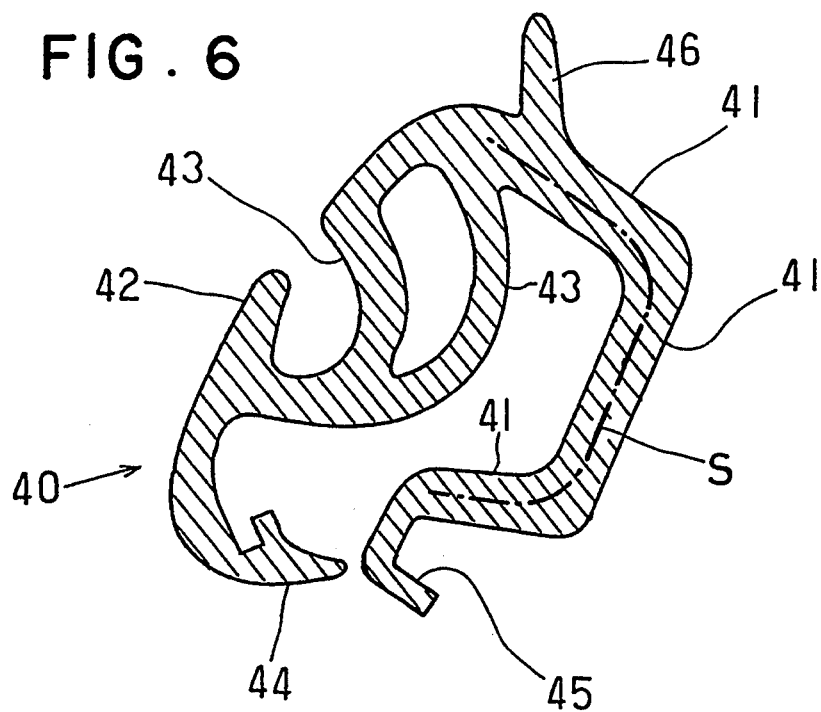
FIG. 6 is a cross-sectional view of a glass run of FIG. 5.

In the second embodiment as illustrated in FIGS. 5 and 6, denoted at 43 is a hollow seal portion which is connected to the upper tip end of the base portion 41 and is directed downward, 42 and 44 are an upper directed lip seal and a lower directed hooking piece which are T-shaped and disposed at the lower tip end of the hollow seal portion 43 and 45 is a hooking portion which is disposed at the lower tip end of the base portion 41 and is directed downward toward the inside of the car for hooking the hooking piece 44.

The weather strip according to the first and second embodiments operates as follows.

Since the base portion 41 of the glass run 40 is formed in the U-shape which opens toward the outside of the car and the core S is embedded therein, the base portion 41 functions as the stopper of the door glass 21 when the door glass 21 strikes against the base portion 41. Furthermore, the gap seal 46 protrudes directly from the surface of the base portion 41, which dispenses with the conventional U-shaped welt 90. Accordingly, it is possible to remarkably shorten the length E extending from the upper end of the door glass 21 to the opening edge 11 of the body 10 and to remarkably in, prove the outward appearance. If the lip seal 42 and the hollow seal portion 43 of the glass run 40 are formed at the state where they are open when they are extruded and molded from raw materials as illustrated in FIGS. 4 and 6, the glass run 40 can be easily assembled by pressing the hooking protrusion 44 provided at the tip end of the hollow seal portion 43 into the hooking portion 45 or hooked thereby after the base portion 41 is fastened to the outer portion 31 of the door ash 30 by the stopper member K.

With the arrangement of the weather strip according to the present invention, the base portion 41, which bas the core S embedded therein and a U-shape in cross section, functions as the stopper of the door glass 21 when the closed door glass 21 strikes against the base portion 41, whereby the length E extending from the upper end of the door glass 21 to the opening edge 11 of the body is remarkably shortened to thereby remarkably improve the outward appearance. Furthermore, the base portion 41 can be easily fastened to the door sash 30.

What is claimed is:

1. A weather strip attached to a vehicle door sash which elastically contacts an opening edge of a vehicle body for sealing a first gap between the body and the door sash and elastically contacts a door glass for sealing a second gap between a door glass and the door sash wherein the door sash includes a substantially L-shaped outer portion and an inner portion which protrudes from the outer portion toward an inside of the vehicle, the weather strip comprising:

a glass run attached to the door sash for elastically contacting the door glass and serving as a stopper of the door glass;

a gap seal extending from an upper surface of the glass run;

a main seal attached to the door sash for elastically contacting the opening edge of the body; and the glass run including a U-shaped base portion which opens toward an outside of the vehicle, a core embedded in the base portion, means for securing the base portion to the outer portion of the door sash, and a lip seal and a hollow seal portion respectively connected to a lower tip end of the base portion wherein a hooking piece formed on an upper free end of the hollow seal portion is hooked by a hooking portion provided at an upper end of the base portion.

2. The weather strip claimed in claim 1, wherein the gap seal elastically contacts a trim engaged with an outer flange of the vehicle body.

3. The weather strip claimed in claim 1, wherein the main seal is attached to an upper surface of the inner portion of the door sash.

4. The weather strip claimed in claim 1, wherein the weather strip further comprises a sub-seal integrally connected to a U-shaped inner trim which is engaged with an inner flange of the vehicle body, the sub-seal elastically contacting an inner surface of the inner portion of the door sash.

5. A weather strip attached to a vehicle door sash which elastically contacts an opening edge of a vehicle body for sealing a first gap between the body and the door sash and elastically contacts a door glass for sealing a second gap between a door glass and the door sash wherein the door sash includes a substantially L-shaped outer portion and an inner portion which protrudes from the outer portion toward an inside of the vehicle, the weather strip comprising:

a glass run attached to the door sash for elastically contacting the door glass and serving as a stopper of the door glass;

a gap seal extending from an upper surface of the glass run;

a main seal attached to the door sash for elastically contacting the opening edge of the body; and the glass run including a U-shaped base portion which opens toward an outside of the vehicle, a core embedded in the base portion, means for securing the base portion to the outer portion of the door sash, a downwardly directed hollow seal portion connected to an upper tip end of the base portion, and an upward directed lip seal and a downward hooking piece respectively disposed in a T-shape and formed at a lower tip end of the hollow seal portion wherein the hooking piece is hooked by a hooking portion provided at a lower tip end of the base portion and extends toward the inside of the vehicle.

6. The weather strip claimed in claim 5, wherein the gap seal elastically contacts a trim engaged with an outer flange of the vehicle body.

7. The weather strip claimed in claim 5, wherein the main seal is attached to an upper surface of the inner portion of the door sash.

8. The weather strip claimed in claim 5, wherein the weather strip further comprises a sub-seal integrally connected to a U-shaped inner trim which is engaged with an inner flange of the vehicle body, the sub-seal elastically contacting an inner surface of the inner portion of the door sash.

* * * * *